United States Patent [19]
Kerklies

[11] 3,805,631
[45] Apr. 23, 1974

[54] DRIVE ASSEMBLIES FOR MINING APPARATUS
[75] Inventor: Bodo Kerklies, Altlunen, Germany
[73] Assignee: Gewerkschaft Eisenhutte Westfalia, Westfalia, Germany
[22] Filed: Oct. 4, 1972
[21] Appl. No.: 295,021

[30] Foreign Application Priority Data
Oct. 4, 1971  Germany.......................... 2149394

[52] U.S. Cl. ............................................ 74/243 H
[51] Int. Cl. ........................................... F16h 55/30
[58] Field of Search ...................... 74/243 R, 243 H

[56] References Cited
UNITED STATES PATENTS
1,970,763  8/1934  Miller et al. ...................... 74/243 H
2,841,454  7/1958  Cheramie...................... 74/243 R X
3,213,703  10/1965  Fitzgerald ..................... 74/243 R X Primary Examiner—Benjamin W. Wyche
Assistant Examiner—Frank H. McKenzie, Jr.
Attorney, Agent, or Firm—Chittick, Thompson & Pfund

[57] ABSTRACT

A drive assembly with a toothed member carried on a shaft and adapted to drive the chains of a scraper chain conveyor. The shaft is mounted for rotation between side walls of a frame and the shaft is composed of portions which progressively decrease in diameter from one side wall to the other. The shaft has a portion adjacent the one side wall which has its exterior forming a drum surface. A further drum component is located on the shaft adjacent the other side wall with the toothed member disposed between the drum surfaces. A detachable blind bearing unit is located in an aperture in the other side wall for receiving the shaft. The drum component and the toothed member are splined onto the shaft so as to be withdrawable from the other side wall after removal of the bearing unit.

The one side wall is apertured to permit the output shaft of drive means to be coupled to the shaft of the assembly.

13 Claims, 1 Drawing Figure

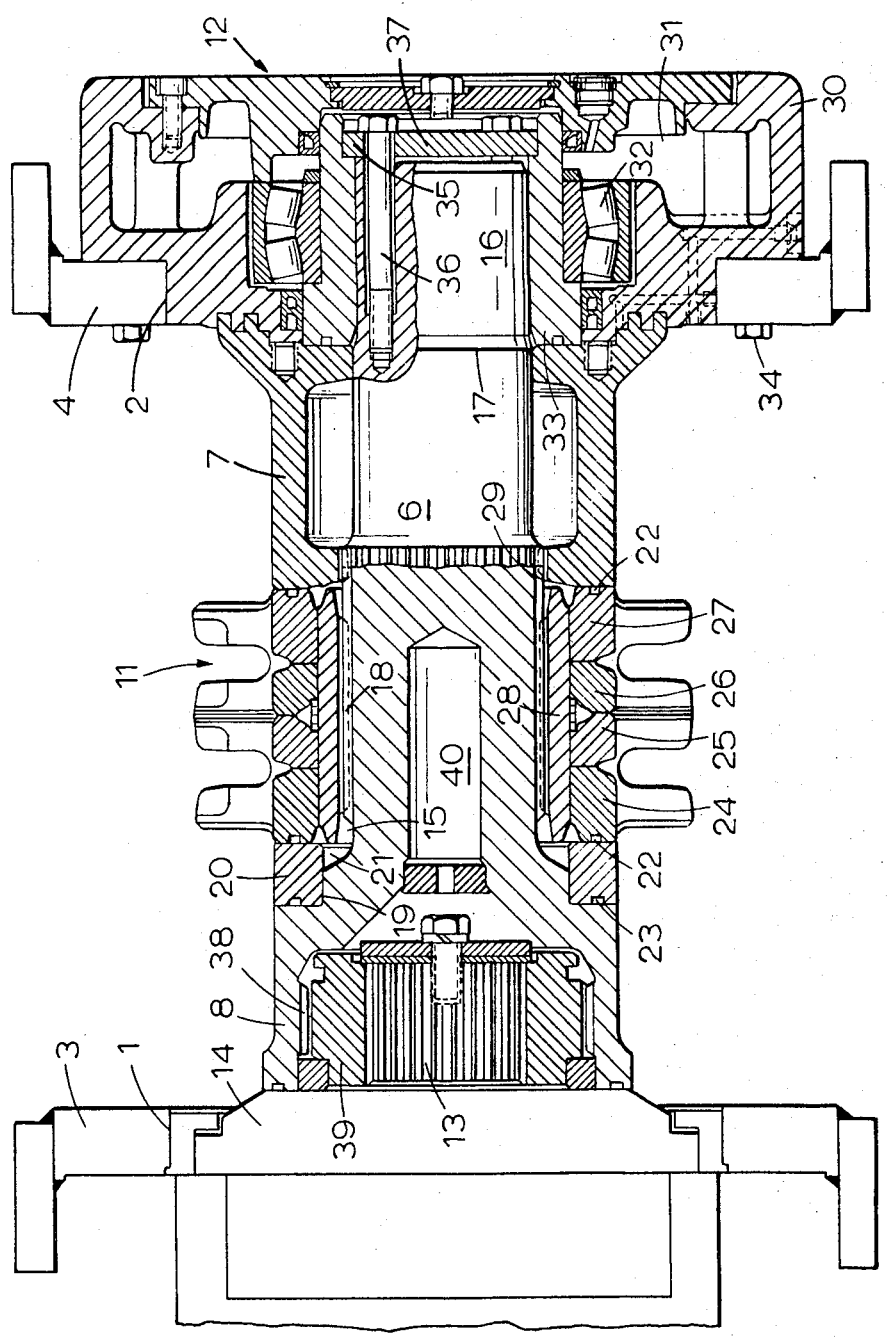

DRIVE ASSEMBLIES FOR MINING APPARATUS

BACKGROUND OF THE INVENTION

The present invention relates to a drive assembly for use with mining apparatus; particularly, but not solely, with scraper chain conveyors.

It is known to provide a drive assembly for the scraper chains of a conveyor, which assembly has a shaft mounted in bearings carried by side walls of a frame for the assembly. Normally the assembly is designed to permit the output shaft of a system of gearing driven by a motor to be coupled directly to the shaft via one of the side walls. The shaft of the assembly carries a toothed member which locates the chains of the conveyor and enables these chains to be driven. From time to time due to wear it is necessary to replace this toothed member and this necessitates extensive dismantling of the assembly. This operation is hampered by the restricted space in the mine working and involves considerable loss of time.

A general object of this invention is to provide an improved assembly inter alia permitting the toothed member to be more readily replaced.

SUMMARY OF THE INVENTION

According to the invention a drive assembly comprises a shaft rotatably mounted between side walls, the shaft being composed of axial portions which progressively decrease in diameter from one side wall to the other, a detachable blind bearing unit attached to the other of said side walls and receiving an end portion of the shaft and a toothed member connected for rotation with the shaft and capable of being dismantled by movement axially of the shaft after detachment of said blind bearing unit. Since the diameter of the shaft decreases towards the bearing unit the toothed member can be removed in this direction after detaching the bearing unit.

Preferably the toothed member is disposed between drum surfaces with the drum part adjacent said one side wall being formed integrally with the shaft. The drum part adjacent the other side wall axially clamps the toothed member and may be a component connected for rotation with the shaft.

The shaft is preferably connected to the toothed member and the drum part component with the aid of inter-engageable axial splines permitting sliding of these parts along the shaft.

The blind bearing unit is of self-contained construction provided with a housing attached to the other side wall with the aid of screws and accommodating a roller bearing locating a bushing surrounding the end portion of the shaft. A cover plate may locate the bushing and cover an aperture in the housing of the bearing unit, the plate being connected to the shaft, with the aid of screws.

Various chambers can be formed in the assembly for containing lubricant.

The invention may be understood more readily and various other features of the invention may become more apparent from consideration of the following description.

BRIEF DESCRIPTION OF DRAWINGS

An embodiment of the invention will now be described by way of example only, with reference to the accompanying drawing which is a sectional view of a drive assembly made in accordance with the invention.

DESCRIPTION OF PREFERRED EMBODIMENT.

As shown in the drawing, the assembly has frame side plates 3, 4 with recesses 1, 2 therein. In general, a shaft 6 extends into the recesses 1, 2. Between the plates 3, 4 are drum parts 7, 8 rotatable with the shaft 6 and between the drum parts 7, 8 is a toothed member 11 adapted to drivably locate the chains of a scraper chain assembly. The shaft 6 is supported for rotation in the plate 4 by means of a blind bearing unit 12. The other end of the shaft 6 is operably connected to a splined portion of the output shaft 13 of drive means. The shaft 13 is located by a bearing 14 carried by the side plate 3.

The shaft 6 receives the splined portion of the shaft 13 in an apertured end portion having its outer periphery forming the drum part 8. This end portion of the shaft 6 progressively decreases in diameter towards the right hand side of the drawing to form a central portion 15 locating the member 11, and a further portion locating the drum part 7. This further portion in turn reducing in diameter at 17 to form an end portion 16 located in the bearing 12.

The interior of the apertured end portion of the shaft 6 has a series of axial splines 38 which mate with splines on the exterior of a coupling member 39 and similarly the interior of the member 39 has splines mating with the output shaft 13. The member 39 can be detachably clamped to the shaft 13.

An axial bore 40 is formed inside the portion 15 of the shaft 6 and this bore 40 serves to store lubricant for feeding the splined connections between the shafts 6, 13.

The portion 15 of the shaft has a series of axial splines 18 around its exterior which mate with corresponding splines 18 formed on the interior of the member 11 and similarly the further portion, located to the right of the portion 15 has splines which mate with splines 29 on the interior of the drum part 7. In this way the member 11 and the drum part 7 are rotatably locked to the shaft 6 but detachable therefrom when moved axially. The toothed member 11 is in the form of individual toothed rings 24 to 27, which are welded together on a sleeve 28 having the splines 18 on its interior.

The drum part 8 has a shoulder 19 which locates a ring 20. An annular chamber 21 used for containing lubricant for feeding the splines 18 is formed by a bevelled or cut away portion of the shaft 6 beneath the ring 20. Sealings rings 22 are provided between the mating faces of the ring 20 and the member 11 and between the mating faces of the member 11 and the drum part 7. The ring 20 also has a sealing ring 23 engaging the radial face of the shoulder 19.

The blind bearing unit 12 has a housing 30 defining an oil chamber 31 communicating with a roller bearing 32 supporting a bushing 33 surrounding the end portion 16 of the shaft 6. The housing 30 is detachably secured to the side plate 4 with the aid of screws or bolts 34. The housing 30 has a central aperture receiving a plate 37 engaging a recessed collar 35 of the bushing 33. Screws 36 inserted through the plate 37 engage in the shaft 6 and axially clamp the assembly together.

The assembly can be dismantled, for example to replace the member 11 when worn, by unscrewing the bolts 34, 36 and removing the unit 12. The drum part 7 and the member 11 can now be slid along the shaft 6 and removed through the aperture 2. The lubricant in the chamber 21 can be replenished if necessary and the components re-assembled.

I claim:

1. A drive assembly for use with mining apparatus; said assembly comprising:
   a. a frame with side walls;
   b. a shaft rotatably mounted between the side walls, the shaft being composed of axial portions which progressively decrease in diameter from one side wall to the other side wall;
   c. a blind bearing unit detachably secured to the other of the side walls and receiving an end portion of said shaft; and
   d. a toothed member connected for rotation with the shaft and withdrawable along the shaft in the direction of said other side wall.

2. A drive assembly according to claim 1, wherein said axial shaft portion having the largest diameter has a first drum part fixed thereon for rotation therewith, and said axial shaft portion having the smallest diameter has a second drum part fixed thereon for rotation therewith, said toothed member being positioned between said drum parts.

3. A drive assembly according to claim 2, wherein the first drum part adjacent said one side wall is formed integrally with the shaft and the second drum part adjacent said other side wall is formed by a separate component connected for rotation with the shaft.

4. A drive assembly according to claim 3, wherein the shaft has a further portion provided with axial splines on its exterior surface which mate with axial splines on the interior surface of the second drum part.

5. A drive assembly according to claim 1, wherein the shaft has a central portion provided with axial splines on its exterior surface which mate with axial splines formed on an interior surface of the toothed member.

6. A drive assembly according to claim 5, wherein the shaft has an annular chamber closed by a ring and sealed with sealing rings, said chamber serving to contain lubricant for the splines of the toothed member.

7. A drive assembly according to claim 1, wherein the blind bearing unit has a housing detachably secured to an aperture in the other side wall.

8. A drive assembly according to claim 7, wherein the housing of the blind bearing unit contains a roller bearing locating a bushing surrounding the end portion of the shaft.

9. A drive assembly according to claim 8, wherein the housing of the blind bearing unit also has a chamber for containing lubricant for the roller bearing.

10. A drive assembly according to claim 7, wherein the housing of the blind bearing unit has a recess which locates a cover plate detachably secured to the shaft.

11. A drive assembly according to claim 1, wherein said one side wall is apertured to permit a further drive shaft to be coupled to the shaft.

12. A drive assembly according to claim 11, wherein the shaft has a hollow end portion adjacent said one side wall which is coupled via an axially splined coupling member to said further shaft.

13. A drive assembly according to claim 12, wherein the shaft has a blind bore which serves to contain lubricant for the splines of the coupling member.

* * * * *